United States Patent [19]
Volk et al.

[11] Patent Number: 5,498,384
[45] Date of Patent: Mar. 12, 1996

[54] METHOD FOR THE PRODUCTION OF EXTRUDATES FROM REGENERABLE RAW MATERIALS

[75] Inventors: Juergen Volk, Berlin; Detlef Kropp, Potsdam, both of Germany

[73] Assignee: Institut fuer Getreideverarbeitung GmbH, Berholz-Rehbruecke, Germany

[21] Appl. No.: 259,597

[22] Filed: Jun. 14, 1994

[30] Foreign Application Priority Data

Jun. 24, 1993 [DE] Germany .......................... 43 21 627.7

[51] Int. Cl.⁶ .................................................. B29C 47/00
[52] U.S. Cl. ............................................. 264/122; 264/109
[58] Field of Search ...................... 264/122, 118, 264/109

[56] References Cited

U.S. PATENT DOCUMENTS

| | | | |
|---|---|---|---|
| Re. 32,329 | 1/1987 | Paszner | 264/108 |
| 5,082,605 | 1/1992 | Brooks | 264/40.6 |
| 5,088,910 | 2/1992 | Goforth et al. | 425/142 |
| 5,266,368 | 11/1993 | Miller | 428/35.6 |
| 5,308,566 | 5/1994 | Huder | 264/118 |

*Primary Examiner*—Mary Lynn Theisen
*Attorney, Agent, or Firm*—Jordan and Hamburg

[57] ABSTRACT

A method for the production of extrudates from regenerable raw materials, using biopolymeric and mineral raw materials. The object of the invention is based on providing a method of the generic species, with which it is possible to improve the properties of the biopolymeric carriers, particularly, to prevent their solubility due to the addition of components and to provide bodies, which are resistant to the effects of water and high temperatures, with prerequisites suitable for use in the industries, which process such bodies further. Pursuant to the invention, this objective is accomplished owing to the fact that the biopolymeric raw materials, in the form of grains such as wheat, rye, corn, triticale, rice, barley and buckwheat, oil seed extraction grist, such as rape, cotton seed, soybean, sunflower and linseed extraction grist, animal wool, such as sheep's wool, plant fibers, such as cotton, flax and linen, wood flour, ground quinine, straw and dried grass and mineral additives, such as finely ground limestone, calcium hydroxide, Portland cement, marl, finely ground fire clays, perlite, kieselguhr, glass and gypsum are mixed with a separately added hydrophobizing agent and processed in an extruder.

18 Claims, No Drawings

METHOD FOR THE PRODUCTION OF EXTRUDATES FROM REGENERABLE RAW MATERIALS

BACKGROUND OF THE INVENTION

The invention relates to a method for the production of extrudates from regenerable raw materials using biopolymeric and mineral raw materials.

The use of pure biopolymers as building materials and fillers is known. Because of the negative properties of these building materials and fillers, particularly their inadequate mechanical and chemical load-carrying capabilities, and because of their high processing costs, their use is very limited.

The use of biopolymers, produced by agriculture and forestry, and the utilization of regenerable natural resources, are an economic requirement and the basis for extensive investigations in research and industry.

The German patent 32, 06 751, IPC C 08 L 3/02, discloses a method for producing foamed, gelatinized starch products, with which grainy or powdered starch or starch-containing materials are heated and extruded in the presence of 10–30% by weight of water and a gas-forming or gas-evolving blowing agent in an extrusion press to temperatures of 60°–220° C.

It is an object of the known solution to produce a foamed material from easily obtainable raw materials using a simple method and to use it in manifold ways in the same way known synthetic resin foams are used. Furthermore, the foamed material would also be suitable for food purposes. The solution has the disadvantage that mineral components are added as a blowing agent or, also as a blowing agent base. The raw materials, used for this purpose, require a prior, separate modification and/or cross-linking. The types of minerals used include calcium carbonate and sodium carbonate.

SUMMARY OF THE INVENTION

It is therefore an object of the invention to provide a method for the production of extrudates from raw materials, preferably regenerable raw materials, with which it is possible to improve the properties of the biopolymeric carriers, particularly their solubility, by the addition of components and to create solid, water-resistant and temperature-resistant bodies with prerequisites suitable for use in industries, which further process these extrudates.

Pursuant to the invention, this objective is accomplished owing to the fact that a method is employed, using biopolymeric raw materials, in the form of grains, such as wheat, rye, corn, triticale, rice, barley and buckwheat, oil seed extraction grist, such as rape, cottonseed, soybean, sunflower and linseed extraction grist, animal wool, such as sheep's wool, plant fibers, such as cotton, flax and linen, wood flour, ground quinine, C-4 plants, straw and dried grass. The biopolymeric raw materials are mixed with mineral additives, preferably finely ground limestone, calcium hydroxide, Portland cement, marl, finely ground fire clays, perlite, kieselguhr, glass and gypsum and also mixed with a separately added hydrophobizing agent. The mixture is processed in an extruder to obtain extrudates.

It is within the scope of the invention that the hydrophobizing agent is added before and/or during the extrusion, preferably as sodium and potassium waterglass, sodium aluminate, silica gel and/or an organic acid including acetic acid and its compound.

DETAILED DESCRIPTION OF THE INVENTION

The invention is developed owing to the fact that the extrudate is formed with the following composition

| biopolymers | 20 to 99% by weight, | preferably | 40 to 90% by weight |
| mineral additives | 0.5 to 65% by weight | preferably | 1 to 30% by weight |
| hydrophobizing agent | 1 to 20% by weight | preferably | 2 to 15% by weight | and the extrusion is carried out under the following conditions.

| extrusion temperature | 50° to 250° C. | preferably | 90° to 200° C. |
| pressure on the composition | 3 to 45 MPa | preferably | 10 to 30 MPa |
| rpm of screw | 100 to 500 | preferably | 150 to 350 |
| moisture content | 0 to 99% | preferably | 10 to 30% |

It is within the further scope of the invention that, when the extrudate, due to the employment of the method, is formed as a granulate or a 2-dimensional product, it has the following product parameters:

| bulk density | 0.060 to 0.800 kg/dm$^3$ 0.080 to 0.300 kg/dm$^3$ | preferably |
| burning behavior | once burning, conditionally continues to burn independently. | |
| water vapor diffusion resistance | 2 to 50 µ | |
| thermal conductivity | 0.035 to 0.060 W/mK | |
| compression strength | 0.8 to 20 N/mm$^2$ | |
| pH | 6 to 11 | |

It is a development of the invention that the products, produced according to the method, are used in building material applications as thermal or sound insulators and, in a further exercise of the invention, for micro-air-conditioning, particularly of living space and work areas.

Further the products, produced pursuant to the invention, can be used as fillers and molded articles in furniture and furnishing elements.

As a further development, it is advantageous to claim that the products, produced according to the method, are constructed so as to be completely biologically degradable.

Advantageously, when carrying out the method, sodium and potassium waterglass, silica gel, sodium aluminate and organic acids, particularly acetic acid, are added as hydrophobizing agents of the method before, during and/or after the extrusion.

An object of the invention is to achieve the advantage of eliminating, by the addition of mineral components to the biopolymeric carriers, the effect of an increased solubility that occurs due to the extrusion process, and to produce products with mechanically and chemically stable properties. As a further advantage of the method, immediate binding of the mineral additives is achieved due to the combined effect of pressure and shear forces as well as of temperature and, in conjunction with the addition of the hydrophobizing agents listed, compounds with hydrophobic activity, for example, in the form of silifications and/or silicalizations, are formed during and/or after the extrusion and positioned in the course of the method especially in the edge layers.

It is to be represented as an advantage that the extrudate, after a coarse comminution, is biologically degradable without problems. The use of these extrudates lies in their natural composition for building material applications in thermal and sound insulation as well as in the micro-air-conditioning of living space and work areas and the associated use as fillers in furniture and furnishing elements.

The present method has the advantage that the mineral additives, including the hydrophobizing agent, are to be extruded with the biopolymeric carrier material in such a manner, that the extrudate obtained is present as a flowable granulate and/or a 2-dimensional product with a homogeneous distribution of the components corresponding to the intended application.

Advantageously, the inventive method provides for the addition of minerals as strengthening components. The starch acts as an expansion agent; its physical parameters are changed, for example, by the increase in water solubility. This fact is inhibited or reversed by the use of the proposed minerals.

It is a further advantage of the method that, in the regime of material use pursuant to the invention, a starting point is the use of grain and/or oil seed extraction grist which, except for a mechanical processing (comminution), experiences no chemical and/or thermal modification before the extrusion. The method as a whole is distinguished, above all, by a low use of specific energy. The method does not require the use of drinking water. It is effluent-free and, thus does not require purification of any water, which may have to be discharged.

An advantage of the inventive method is that carbonate-containing materials (natural materials, such as limestone flour and finely ground fire clay with extraneous components) are used. This mineral component represents the binding element to the hydrophobizing agent. The addition of acid is related to the formation of silica gels; acid is added only in the presence of waterglass. The structure-forming effect is a decisive advantage of the addition of waterglass.

The invention will be described in greater detail by means of Examples.

EXAMPLE 1

A conventional, commercial milling product (100 kg) of rye, with a moisture content of 14%, is mixed with 10 kg of calcium hydroxide and 10 kg of potassium waterglass. This mixture is added to an extruder; the potassium waterglass portion can also be added during the extrusion. The strand, emerging from the nozzle of the extruder, is granulated by means of rotating knife blades to a grain size of 6 to 10 mm. The extruder is operated at temperature ranging from 80° to 150° C. The pressure on the composition is 8 to 10 MPa and the screws rotate at 350 rpm.

The addition of acetic acid during the extrusion improves the hydrophobizing effect of the potassium waterglass by precipitating insoluble silicate compounds. The extrudate has a bulk density of 0.100 kg/dm$^3$. The danger of burning is very limited, since the granulate, once burning, continues to burn automatically only conditionally. The resistance to the diffusion of water vapor is 3–4 μ. The thermal conductivity attains 0.040 W/mK at a compression of 1.5 N/mm$^2$. The pH is classified as 7 to 8. The product, produced pursuant to the method, can be used as a building material, particularly as a thermal insulator.

EXAMPLE 2

Oil seed extraction grist (50 kg), such as rape extraction grist, is mixed with 30 kg of grain, such as barley fine grist, 10 g of wood flour, 5 kg of finely ground fire clay and 5 g of perlite. The addition of 12 kg of silica gel adjusts the moisture content to 25%. The extrusion is carried out under the following conditions:
rpm of the screw: 150, pressure on the composition 30 MPa, extrusion temperature profile: 90° to 180° C.

The material leaves the extruder nozzle at the head end as a 2-dimensional product having the dimensions of 350 mm ×15 mm. It has a bulk density of 0.300 kg/dm$^3$. The water diffusion resistance is 5 to 6 μ, the compression strength 10 N/mm$^2$ and the thermal conductivity is 0.060 W/mK.

The product can be used as a sound insulator or micro-air-conditioning element. After a coarse comminution, it is completely biologically degradable.

EXAMPLE 3

Plant fibers (10 kg), such as flax, and 45 g of grain, such as triticale, are mixed with 40 kg of finely ground limestone. During the extrusion, the moisture content is adjusted to 20% by the addition of 8 kg of a sodium aluminate/sodium hydrogen carbonate/waterglass solution. The extrusion conditions are as follows: extrusion temperature profile: 85° to 135° C., rpm of screw: 225, pressure on composition: 10 MPa.

The granulate, with dimensions of 10 to 20 mm, has a bulk density of 0.250 kg/dm$^3$ and is used as filler for furnishing elements.

We claim:

1. A method for the production of extrudates from regenerable raw materials comprising mixing biopolymeric and mineral raw materials, adding a hydrophobizing agent to the mixture and processing in an extruder.

2. The method of claim 1, wherein the hydrophobizing agent is added before extrusion and said hydrophobizing agent is at least one selected from the group consisting of sodium and potassium water glass, silica gel, sodium aluminate and organic acids.

3. The method of claim 1, wherein the composition is composed as follows:

| | |
|---|---|
| biopolymers | 20 to 90% by weight |
| mineral additives | 0.5 to 65% |
| hydrophobizing agent | 1 to 20% by weight. |

4. The method of claim 1, wherein the composition consists of, as follows:

| | |
|---|---|
| biopolymers | 35 to 90% by weight |
| mineral additives | 1 to 50% by weight |
| hydrophobizing agent | 1 to 15% by weight. |

5. The method of claim 1, wherein the following extrusion conditions are used:

| | |
|---|---|
| extrusion temperature | 50° to 250° C. |
| pressure on composition | 3 to 45 MPa |

-continued

| | |
|---|---|
| rpm of screw | 100 to 500 |
| moisture content | 0 to 99%. |

6. The method of claim 1, wherein the following extrusion conditions are used:

| | |
|---|---|
| extrusion temperature | 70° to 200° C. |
| pressure on composition | 10 to 30 MPa |
| rpm of screw | 100 to 350 |
| moisture content | 10 to 30%. |

7. The method of claim 1, wherein extrudates obtained from processing in the extruder, in granular or 2-dimensional form, have the following product parameters:

| | |
|---|---|
| bulk density | 0.060 to 0.800 kg/dm$^3$ |
| burning behavior | once burning, conditionally continues to burn independently |
| water vapor diffusion resistance | 2 to 50μ |
| thermal conductivity | 0.035 to 0.060 W/mK |
| compression strength | 0.6 to 20 N/mm$^2$ |
| pH | 6 to 11. |

8. The method of claim 1, wherein products, produced from extrudates obtained from processing in the extruder are used in building material applications as thermal and sound insulating materials.

9. The method of claim 1, wherein products, produced from extrudates obtained from processing in the extruder are used for micro-air-conditioning.

10. The method of claim 1, wherein products, produced from extrudates obtained from processing in the extruder are used as fillers in furniture and furnishing elements.

11. The method of claim 1, wherein products, produced from extrudates obtained from processing in the extruder are used as molded objects in furniture and furnishing elements.

12. The method of claim 1, wherein products, produced by the method, are completely biologically degradable.

13. The method of claim 1, wherein the biopolymeric raw materials are at least one selected from the group consisting of grains, oil seed extracting grist, animal wool and plant fibers.

14. The method of claim 13, wherein the grains are at least one selected from the group consisting of wheat, rye, corn, triticale, rice, barley and buckwheat; the oil seed extracting grists are at least one selected from the group consisting of rape seed, cotton seed, soybean, sunflower and linseed; the animal wool is sheep's wool; the plant fibers are at least one selected from the group consisting of cotton, flax, linen, wood flour, ground quinine, straw and grass.

15. The method of claim 1, wherein the mineral raw materials are at least one selected from the group consisting of limestone, calcium hydroxide, Portland cement, marl, fire clays, perlite, kieselguhr, glass and gypsum.

16. The method of claim 1, wherein the hydrophobizing agent is added during extrusion.

17. The method of claim 2, wherein the organic acid is acetic acid.

18. The method of claim 7, wherein the bulk density is 0.080 to 0.300 kg/dm$^3$.

* * * * *